United States Patent Office 3,135,918
Patented June 2, 1964

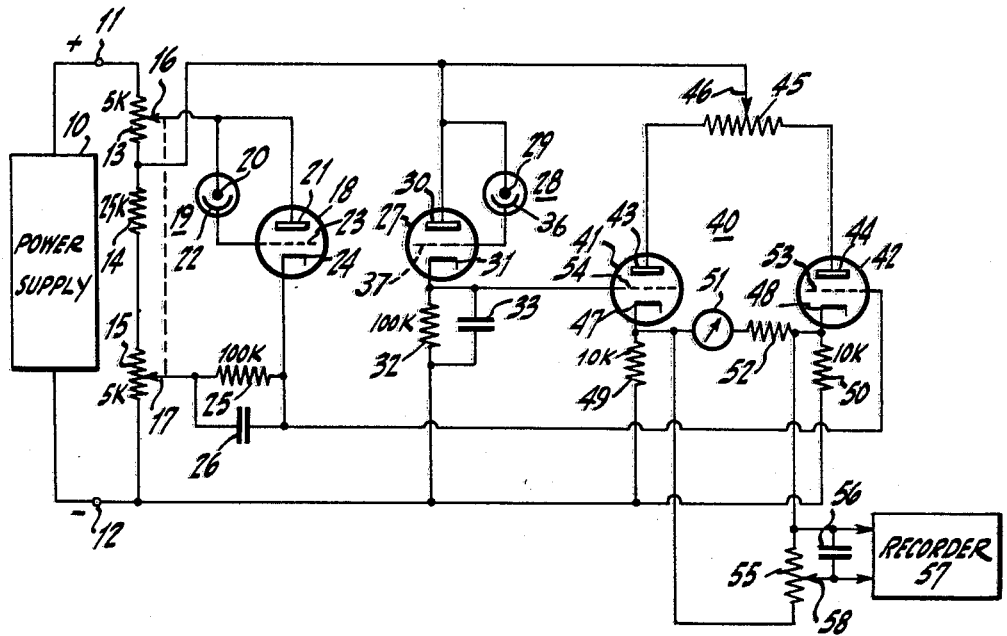

3,135,918
PLURAL INPUT SIGNAL COMPARING MEANS USING DIFFERENTIAL ELECTROMETER AMPLIFIER MEANS
Gustav Bergson, Hatboro, Pa.
(Benson Apt. 319, Jenkintown, Pa.)
Filed May 23, 1961, Ser. No. 112,006
7 Claims. (Cl. 324—140)

This invention relates generally to electrical amplifying systems for the amplification of direct current and relatively low frequency alternating currents. More particularly this invention relates to electrometer amplifiers for amplifying minute currents to a level to drive an indicating system such as a recorder or a meter.

Electrometer amplifiers are often used in metering or recording systems to amplify minute electrical currents, derived from a suitable transducer, to a level sufficient to drive a recorder, meter, or the like. The transducer responds to a quality or quantity of the substance which is being measured to produce a corresponding electrical signal. Since the electrical signal may vary in magnitude over wide ranges, measuring systems are usually provided with some form of range control means to expand the indicator scale for small signals and compress the scale for large signals.

In certain applications such as in industrial or chemical processes, it is desirable to monitor a quality or quantity of a substance, which quality or quantity is expected to vary within predetermined limits. In such cases it is desirable to be able to set the measuring system which includes some form of indicating means to utilize the full scale for indicating the variations of the substance being measured between the aforestated predetermined limits. In other words, when the quality or quantity of the substance is at one limit, it is desirable to have the indicating system indicate zero or a minimum scale reading, whereas at the opposite limit the indicating system should indicate a maximum or full scale reading. Furthermore, the measuring system should be capable of simple adjustment to enable utilization of the full scale for indicating the measurements of substances where the quality or quantity varies between different predetermined limits. In this manner, the entire indicator scale is utilized to provide a more accurate measurement than would be obtained if only a portion of the scale is used.

Accordingly it is an object of this invention to provide an improved electrometer amplifier system.

Another object of this invention is to provide an improved measuring system which is adjustable to utilize the full scale of an indicator such as a recorder for measuring the variations of the quality or quantity of a substance between predetermined limits.

In accordance with the invention, an electrical signal corresponding to the quality or quantity of a substance being measured is applied to an electrometer amplifier device having an output impedance element. A reference signal is applied to a reference amplifier device which also has a load impedance element. The output signals appearing across the two load impedance elements are compared differentially to provide an indication of the level of the applied signal.

To adjust the system to indicate zero for the minimum applied input signal even though the input signal is not equal to the reference signal, the operating voltage applied to the electrodes of the first amplifier device are adjusted relative to the operating voltages on the corresponding electrodes of the second amplifier device. In other words, although the voltage between the electrodes of the first amplifier device remains substantially constant, the particular voltages on these electrodes are adjusted with respect to the particular voltages on the electrodes of the second device. This adjustment effectively inserts a voltage in series with the voltage corresponding to the minimum input signal level appearing across the load impedance element for the electrometer amplifier device. The inserted voltage is selected to be of a magnitude such that its sum with the voltage across the electrometer amplifier load impedance element equals the voltage across the load impedance element of the reference amplifier device. In such a case the resultant differential voltage appearing across the two load impedance elements is zero, and such will be the indication.

To adjust the system to indicate the full scale or maximum for the maximum applied input signal, a selectable portion of the resultant differential signal may be applied to the indicating system.

The measuring and electrometer amplifier system described is simple and economical to build in that a single power supply is used to provide not only the energizing voltages for the amplifying devices, but also an adjustable suppression voltage for setting the system to a minimum indication in response to the minimum limit of the applied input signal. In addition, the circuit for developing the suppression voltage is at a relatively low impedance point in the electrometer amplifier circuit and therefore effectively out of the signal circuit. This feature, coupled with the simplicity of the suppression voltage circuit limits the amount of stray capacitance added to the electrometer amplifier circuit, thereby reducing the susceptibility of the amplifier to regeneration and stray signal pickup such as 60 cycle hum.

It is accordingly a further object of this invention to provide an improved measuring system including an electrometer amplifier for an applied signal and a reference amplifier to provide a differential indication of an applied input signal wherein a single power supply is used for energizing the electrometer and reference amplifiers and for providing an adjustable suppression voltage to balance the output voltages of the two amplifiers, in response to a minimum applied signal.

A still further object of this invention is to provide an improved measuring and indicating system including an electrometer amplifier and a reference amplifier to provide a differential indication of an applied input signal which includes a zero suppression voltage supply circuit connected at a relatively low impedance point in the electrometer amplifier circuit to balance the outputs of the electrometer and reference amplifiers, without substantially changing the energizing voltage appearing between the electrodes of the electrometer amplifier.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing the sole figure of which is a schematic circuit diagram of a measuring system including an electrometer amplifier embodying the invention.

The measuring system of the invention comprises a power supply 10 which provides a direct voltage at the terminals 11 and 12 for energizing the amplifier devices used in the system, and for providing a zero suppression voltage as will hereinafter be described. A voltage divider including three resistors 13, 14 and 15 is connected in series between the terminals 11 and 12. The resistors 13 and 15 have adjustable contacting elements 16 and 17 respectively, which are ganged for unicontrol operation as is indicated by the dashed line in the drawing.

An electrometer amplifier device, which is shown as a triode vacuum tube 18, is connected to receive an electrical signal corresponding to a quality or quantity of a substance being measured. In the present instance, the input signal is derived from a phototube 19 which has its anode 20 connected to the anode 21 of the triode 18, and its cathode 22 connected to the control grid 23 of the triode 18. The anodes 20 and 21 of the phototube 19 and the triode 18 are both connected to the contacting element 16 of the resistor 13.

The cathode 24 of the triode 18 is connected through a resistor 25, which is bypassed by a capacitor 26, to the contacting element 17 of the resistor 15. Since the power supply is connected so that the terminal 11 is positive with respect to the terminal 12, the contacting element 16 and hence the anodes 20 and 21 of the phototube 19 and triode 18 are positive with respect to the contacting element 17 and cathode 24.

A reference amplifier device which is shown as a triode vacuum tube 27 is connected to receive a reference signal which in this instance is derived from a phototube 28. The anode 29 of the phototube 28 and the anode 30 of the triode 27 are both connected to the junction of the resistors 13 and 14. The cathode 36 of the phototube 28 is connected to the control grid 37 of the triode 27, and the cathode 31 of the triode 27 is connected through the resistor 32 and its bypass capacitor 33 to the negative terminal 12 of the power supply.

The output signal from the electrometer amplifier appearing across the resistor 25 is compared differentially with the output signal from the reference amplifier appearing across the resistor 32 in a differential amplifier 40. The differential amplifier 40 comprises a pair of triode vacuum tubes 41 and 42 whose anodes 43 and 44 respectively are connected together through a resistor 45. An adjustable contact element 46 on the resistor 45 is connected to the junction of the resistors 13 and 14 to apply operating potentials to the tube 41 and 42. The cathodes 47 and 48 are connected through the resistors 49 and 50 respectively to the negative terminal 12 of the power supply. In addition, a zero center microammeter 51 and a high resistance resistor 52 are connected in series between the cathodes 47 and 48.

Applied electrical signals corresponding to the quality or quantity of a substance being measured, and translated by the triode 21 are developed across the resistor 25 and applied to the control grid 53 of the triode 42. Reference signals translated by the triode 27 are developed across the resistor 32 and applied to the control grid 54 of the triode 41. The signals applied to the triodes 41 and 42 are developed across the resistors 49 and 50 respectively, with the signal appearing across the resistor 50 corresponding to the input signal, and the signal across the resistor 49 corresponding to the reference signal. The difference in voltage appearing between the cathodes 47 and 48 is developed across a resistor 55 connected therebetween. A portion of the signal across the resistor 55 is filtered by a capacitor 56 and applied to a recorder 57. The amount of voltage applied to the recorder 57 is determined by the setting of an adjustable contact element 58 on the resistor 55.

The measuring system of the invention is useful in a wide variety of applications. Illustrative of the applications is a gas analyzing system wherein it is desirable to monitor and record the relative quantity of a given component of a gas present in a gas stream which may be used in a chemical or other industrial process. A gas analyzing system of this type is described in U.S. Patent 2,878,388, issued to Gustav Bergson on March 17, 1959. In such a system radiant energy is directed through a sample of gas to be tested, to a photoelectric cell. The quantity of the component of gas under test will be indicated by the absorption of certain wavelengths of the radiant energy. In the present case when more of the component of the gas being measured appears in the sample, less radiant energy reaches the photoelectric cell 19, and consequently the triode 18 draws less current. This is because the amount of current through the photoelectric cell is a function of the amount of radiant energy that impinges thereon. To provide a reference which takes into account variations in the strength of the radiant energy emitted by the radiant energy source, variations of the power supply potential, and the like, the radiant energy is also directed in a path that either bypasses the gas sample, or utilizes optical filters to substantially remove the absorbed wavelengths, to a reference photoelectric cell 28.

Initially, the system is balanced by shielding both of the photoelectric tubes 19 and 28 from the radiant energy, and the contact elements 16 and 17 are both moved to their lower-most position so that the same voltages are applied to all of the tubes. The adjustable contact element 46 of the resistor 45 is then adjusted until the meter 51 indicates that zero current flows between the cathodes of the tubes 41 and 42. The shielding may then be removed from the photoelectric tubes 19 and 28.

In measuring a given component of a gas stream, it may be determined that the amount of the component to be measured will vary between given limits. In such a case it is desirable to be able to have these limits correspond to the maximum limits of the recorder to give best resolution. The recorder may comprise a meter or any known form of a recorder such as a chart recorder.

To adjust the system so that the recorder 57 provides a minimum indication when the minimum amount of the gas component being measured is present, a filter which provides the same attenuation of radiant energy as said minimum amount of gas component is inserted between the radiant energy source and the photoelectric cell 19 when none of the component is present. Due to the differences in the transmission efficiency of the radiant energy paths to the photoelectric cells 19 and 28, the tube 18 will draw less current than the tube 27, thereby causing a more positive voltage to be developed at the cathode 31 than at the cathode 24. This produces a corresponding difference in voltage between the cathodes 47 and 48 of the triodes 41 and 42. The adjustable contact elements 16 and 17, which are controlled by a common means such as a control knob, are then simultaneously moved upwardly as viewed in the drawings. This action effectively inserts a positive voltage, appearing between the contact element 17 and the terminal 12, and herein called a zero suppression voltage, in series with the voltage appearing across the resistor 25. The contact elements 16 and 17 are adjusted to a point where the combined voltage appearing across the resistor 25 and the portion of the resistor 15 between the contact element 17 and the terminal 12 is equal to the voltage appearing across the resistor 32. This condition will be indicated when the meter 51 indicates zero current flow between the cathodes 47 and 48 of the triode 41 and 42.

To adjust the system so that the recorder provides a maximum indication when the maximum amount of the gas component being measured is present, a filter which provides the same attenuation of radiant energy as the said maximum amount of gas component is inserted between the radiant energy source and the photoelectric cell 19, when none of the gas component is present. Again, due to the difference in transmission efficiency of the radiant energy paths to the photoelectric cells 19 and 28, the triode 18 will draw even less current than before. Thus the cathode of the triode 18 will be less positive than the cathode of the triode 27 by an amount corresponding to the maximum amount of the component being measured. This difference voltage is translated by the triodes 41 and 42 and appears between their cathodes 47 and 48. In other words the voltage difference appears across the resistor 55. The contact element 58 is then adjusted until the amount of voltage fed to the recorder 57 is sufficient to drive the recorder to a full scale indication under these conditions.

A feature of the invention is that only a single power supply is required to provide the operating potentials for the amplifier devices and the zero suppression voltage. It will be noted that the voltage applied to the triode 18 remains constant even with adjustment of the contact elements 16 and 17; since as the contact element 16 goes more positive or more negative, the contact element 17 goes more positive or more negative by a like amount. In this manner the operating point of the triode 18 remains at the same point over the full range of adjustment of the contact elements 16 and 17.

Furthermore it will be seen that the zero suppression voltage which is developed between the contact element 17 and the terminal 12 is at a low impedance point in the amplifier system. Ordinarily the load resistor 25 for the electrometer amplifier 18 will be in the neighborhood of 100,000 ohms whereas the resistance of the resistor 15 is in the neighborhood of 5,000 ohms. Thus with maximum zero suppression voltage, the contact element 17 is at a much lower impedance level than the cathode 24 of the amplifier. This feature minimizes the amount of capacitance introduced into the amplifier circuit, and thereby decreases the susceptibility of the system to regeneration or stray signal pickup such as 60 cycle hum.

It is clear that modifications of the circuits described and claimed herein may be made without departing from the scope of the invention. For example, load resistors may be connected to the anode circuits of the tubes 18 and 27, and the output voltages from the tubes may be taken from the anodes rather than the cathodes. Under these circumstances the anode 30 of the tube 27 would be connected to the terminal 11 and the cathode 31 would be connected to the junction of the resistors 14 and 15. The operation of the circuit changed in this manner is essentially the same as described above, except that the zero suppression voltage is derived between the contacting element 16 and the terminal 11. To balance the modified system the contacting elements 16 and 17 are their uppermost position when the phototubes are shielded.

What is claimed is:

1. An electrical circuit comprising first and second terminals for connection to a direct current power source, a voltage divider comprising first, second and third resistors connected in the order named between said first and second terminals, means providing contacting elements on said first and third resistors, a first amplifier tube having an anode, control grid and cathode, means for connecting the anode of said first tube to the contacting element on said first resistor, a first load resistor connected between the cathode of said first tube and the contacting element on said third resistor, means providing a signal input circuit connected with the control grid of said first tube, a second amplifier tube having an anode, a cathode and a control grid, means connecting the anode of said second tube to the junction between said first and second resistors, a second load resistor connected between the cathode of said second tube and said second terminal, means providing a reference signal input circuit connected with the control grid of said second tube, and means for comparing the voltages developed at the cathodes of said first and second tubes.

2. An electrical circuit comprising first and second terminals for connection to a direct current power source, a voltage divider comprising first, second and third resistors connected in the order named between said first and second terminals, means providing contacting elements on said first and third resistors, a first amplifier tube having an anode, control grid and cathode, means for connecting the anode of said first tube to the contacting element on said first resistor, a first load resistor connected between the cathode of said first tube and the contacting element on said third resistor, means providing a signal input circuit connected with the control grid of said first tube, a second amplifier tube having an anode, a cathode and a control grid, means connecting the anode of said second tube to the junction between said first and second resistors, a second load resistor connected between the cathode of said second tube and said second terminal, means providing a reference signal input circuit connected with the control grid of said second tube, an output resistor having a contacting element, means for coupling said output resistor to said first and second tubes to develop thereacross a voltage related to the voltage difference between the cathodes of said first and second tubes, and indicator means connected between the contacting element for said output resistor and an end terminal thereof whereby said circuit may be set to provide a minimum indication on said indicator means in response to a minimum level of applied input signal by simultaneously adjusting the contacting elements of said first and third resistors in the same direction for minimum voltage drop across said output resistor, and set to provide a maximum indication of said indication means in response to a maximum level of applied input signal by adjusting the contacting element of said output resistor to provide a voltage to said indicator means of a level to cause said maximum indication.

3. An electrical circuit comprising first and second terminals for connection to a direct current power source, a voltage divider comprising first, second and third resistors connected in the order named between said first and second terminals, means providing contacting elements on said first and third resistors, a first amplifier tube having an anode, control grid and cathode, a first load resistor for said first tube, means connecting said first load resistor in series with the anode-cathode current path of said first tube between the contacting elements on said first and third resistors, means providing a signal input circuit connected with the control grid of said first tube, a second amplifier tube having an anode, a cathode and a control grid, a second load resistor for said second tube, means connecting said second load resistor in series with the anode-cathode current path of said second tube between the junction of said first and second resistors and said second terminal, means providing a reference signal input circuit connected with the control grid of said second tube, and means for comparing the voltages developed across said first and second load resistors.

4. An electrical circuit comprising first and second terminals for connection to a direct current power source, a voltage divider comprising first, second and third resistors connected in the order named between said first and second terminals, means providing contacting elements on said first and third resistors, a first amplifier tube having an anode, control grid and cathode, a first load resistor for said first tube, means connecting said first load resistor in series with the anode-cathode current path of said first tube between the contacting elements on said first and third resistors, means providing a signal input circuit connected with the control grid of said first tube, a second amplifier tube having an anode, a cathode and a control grid, a second load resistor for said second tube, means connecting said second load resistor in series with the anode-cathode current path of said second tube between the junction of said first and second resistors and said second terminal, means providing a reference signal input circuit connected with the control grid of said second tube, an output resistor having a contacting element, means for coupling said output resistor to said first and second tubes to develop thereacross a voltage related to the voltage difference developed across the first and second load resistors, and indicator means connected between the contacting element for said output resistor and an end terminal thereof whereby said circuit may be set to provide a minimum indication of said indicator means in response to a minimum level of applied input signal by simultaneously adjusting the contacting elements on said and third resistors in the same direction for minimum voltage drop across said output resistor, and set to provide a maximum indication in said indicator means in response to a maximum level of applied input signal by adjusting the contacting element of said output resistor to provide a voltage to said indicator means to said maximum indication.

5. An electrical circuit comprising first and second terminals for connection to a direct current power source, a voltage divider comprising first, second and third resistors connected in the order named between said first and second terminals, means providing contacting elements on said first and third resistors, a first amplifier tube having an anode, control grid and cathode, a first load resistor connected in series with the anode-cathode current path of said first tube, means providing a signal input circuit connected with the control grid of said first tube, a second amplifier tube having an anode a cathode and a control grid, a second load resistor connected in series with the anode-cathode current path of said second tube, means providing a reference signal input circuit connected with the control grid of said second tube, means connecting one of said series circuits between the contacting elements on said first and third resistors and the other of said series circuits between the junction of said first and second resistors and said second terminal, and means for comparing the voltages developed across said first and second load resistors.

6. A differential amplifier circuit comprising a pair of terminals for connection to a direct current power source, means providing a voltage divider connected between said terminals, a pair of adjustable contacting elements and an intermediate tap on said voltage divider, a first amplifier device and a load impedance element therefore connected in series between said contacting devices, a second amplifier device and a load impedance element therefor connected in series between said tap and one of said terminals, first and second signal input circuits for said first and second amplifier devices respectively, and means coupled to said one terminal and the load impedance elements for said first and second amplifier devices for comparing the voltages across said first and second load impedance elements, said adjustable contacting elements being adjustable to control the difference in voltage across said load impedance elements applied to said comparing means.

7. A differential amplifier circuit comprising a pair of terminals for connection to a direct current power source, means providing a voltage divider connected between said terminals, a pair of adjustable contacting elements and an intermediate tap on said voltage divider, a first amplifier device having an output electrode, a first load impedance element connected to said output electrode, means connecting the series combination of said load impedance element and said first amplifier device between said contacting elements, a second amplifier device having an output electrode, a second load impedance element connected to the output electrode for said second device, means connecting the series combination of said second amplifier device and said second load impedance element between said tap and one of said terminals, first and second signal input circuits for said first and second amplifier devices respectively, and means coupled between said one terminal and said output electrodes for comparing the voltages across said first and second impedance elements, said adjustable contacting elements being adjustable to control the difference in voltage across said first and second load impedance elements applied to said comparing means.

References Cited in the file of this patent

UNITED STATES PATENTS

| | | |
|---|---|---|
| 1,927,846 | Rath | Sept. 26, 1933 |
| 2,219,188 | Kuehni | Oct. 22, 1940 |
| 2,802,181 | Gorski | Aug. 6, 1957 |
| 2,954,517 | Menzel | Sept. 27, 1960 |

FOREIGN PATENTS

| | | |
|---|---|---|
| 664,244 | Great Britain | Jan. 2, 1952 |